United States Patent [19]
Pope

[11] Patent Number: 5,161,666
[45] Date of Patent: Nov. 10, 1992

[54] CONVEYOR BELT CLEANER

[75] Inventor: Ralph E. Pope, Cumming, Ga.

[73] Assignee: Hugh D. Eller, Bedford, Tex.

[21] Appl. No.: 749,889

[22] Filed: Aug. 26, 1991

[51] Int. Cl.⁵ ............................................. B65G 45/16
[52] U.S. Cl. .................................... 198/498; 198/496
[58] Field of Search ........................... 198/496, 498; 15/256.52

[56] References Cited

U.S. PATENT DOCUMENTS

| | | | |
|---|---|---|---|
| 2,652,920 | 9/1953 | Bowman | 198/498 |
| 3,161,285 | 12/1964 | Hummer et al. | 198/498 |
| 3,212,631 | 10/1965 | Thompson | 198/498 X |

FOREIGN PATENT DOCUMENTS

| | | | |
|---|---|---|---|
| 0897087 | 4/1972 | Canada | 198/498 |
| 2604382 | 8/1976 | Fed. Rep. of Germany | 198/498 |
| 0235119 | 10/1987 | Japan | 198/498 |
| 0221013 | 9/1990 | Japan | 198/498 |
| 8302439 | 7/1983 | World Int. Prop. O. | 198/498 |

*Primary Examiner*—Robert P. Olszewski
*Assistant Examiner*—James R. Bidwell
*Attorney, Agent, or Firm*—B. J. Powell

[57] ABSTRACT

Apparatus for cleaning clinging residual material from a conveyor belt including a ribbed cleaning roll supported rotatably adjacent to a surface of a conveyor belt to be cleaned by mounting assemblies on opposite sides of the conveyor belt. A drive motor for rotating the ribbed cleaning roll is mounted to one of the mounting assemblies by a motor mount which includes an alignment mechanism for selectively locating the drive motor along three perpendicular axes for movement to coaxially align the motor and the cleaning roll.

11 Claims, 4 Drawing Sheets

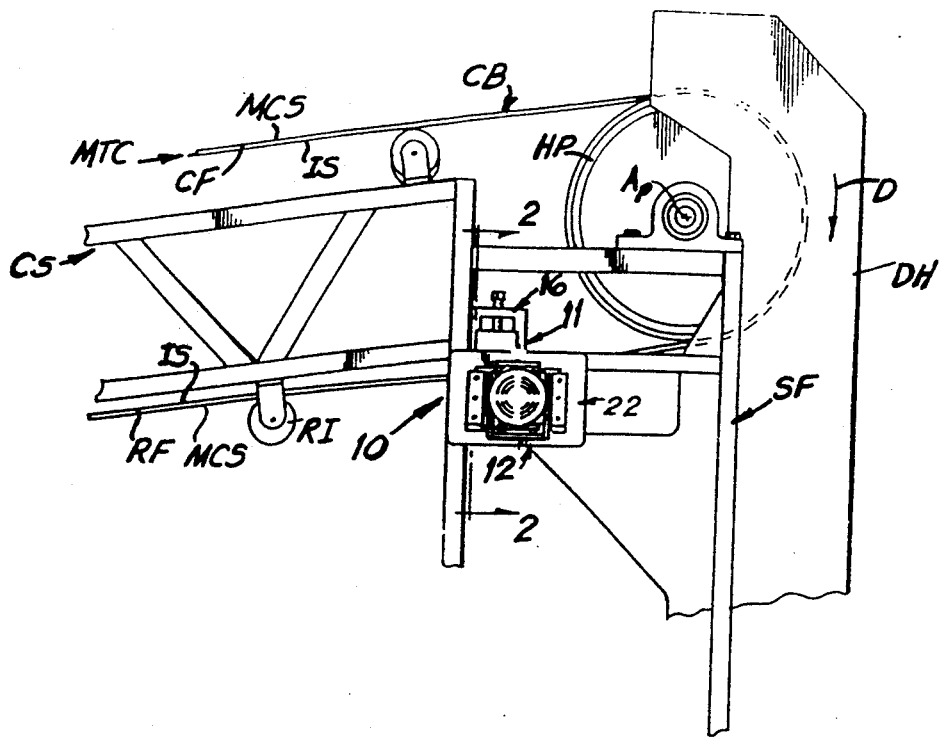
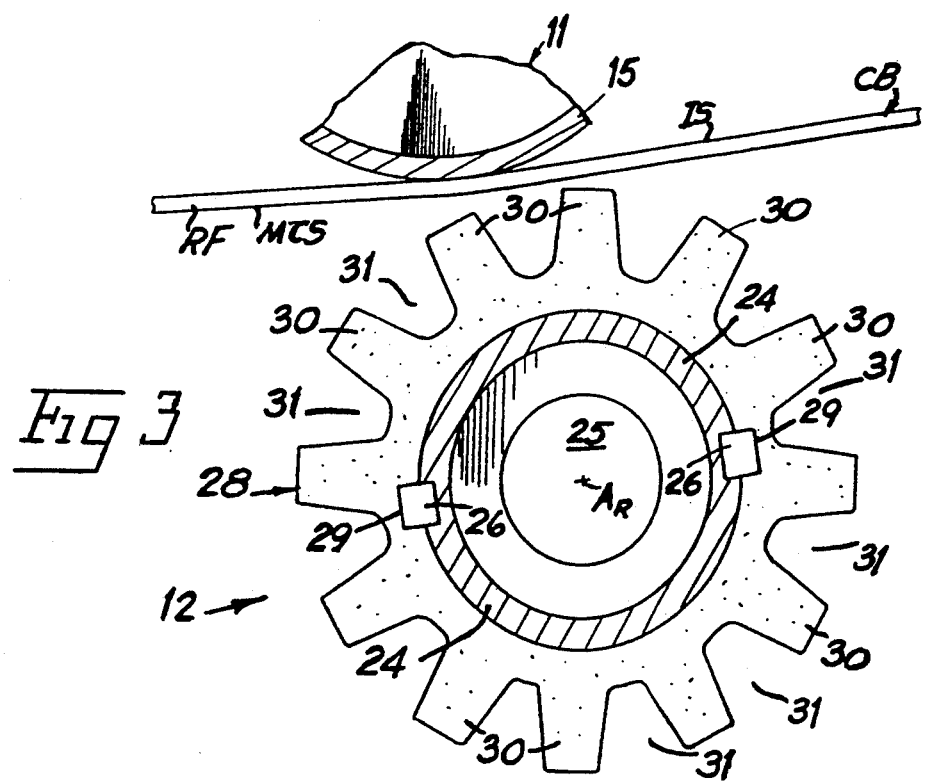
Fig 3

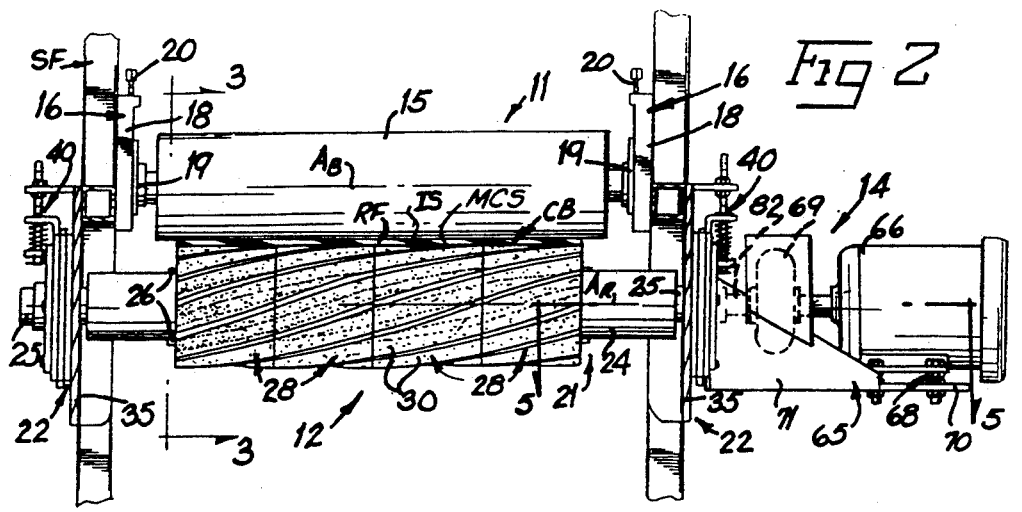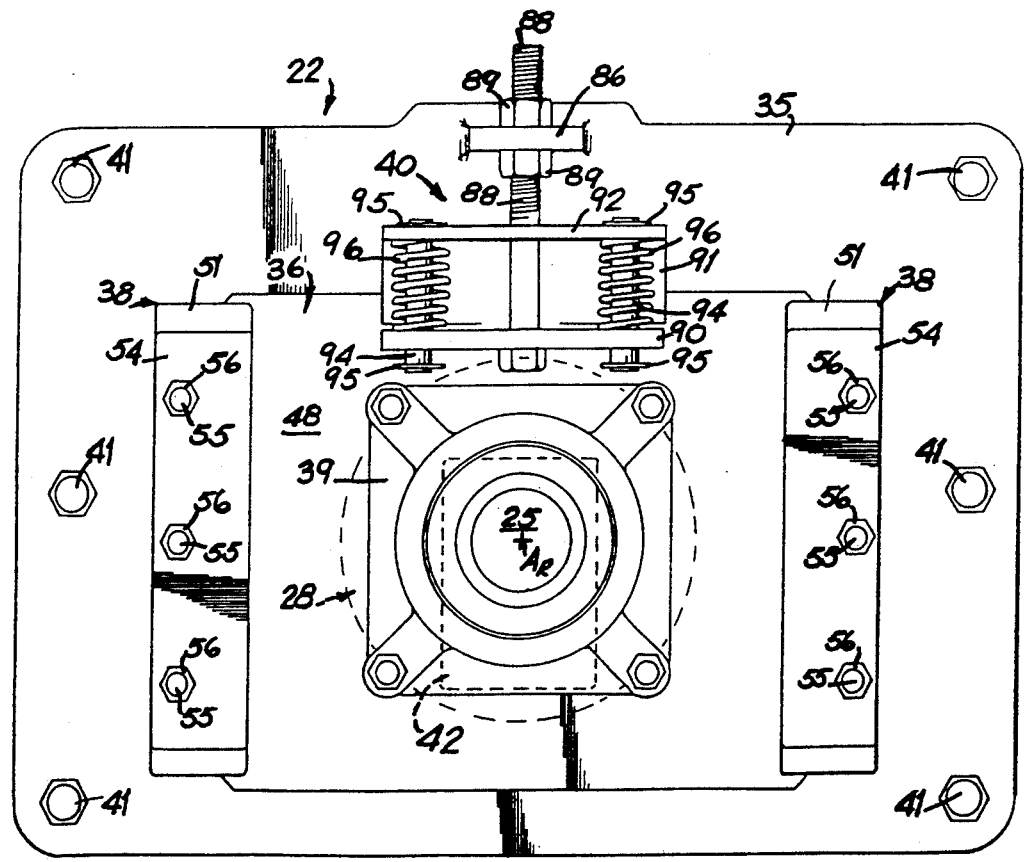

CONVEYOR BELT CLEANER

BACKGROUND OF THE INVENTION

This invention relates generally to conveyor belt cleaners and more particularly to conveyor belt cleaners using a ribbed rotating roll as the cleaning element.

A variety of conveyor belt cleaners are available on the market today to clean any residual material clinging to the conveyor belt on its return flight. These conveyor belt cleaners use various types of cleaning elements that contact the conveyor belt such as scraper blades, rotating brushes, rotating ribbed rolls and the like. To minimize wear on the conveyor belt, those portions of the cleaning element contacting the conveyor belt are generally made of an elastomeric material. These cleaning elements are positively forced against the return flight of the conveyor belt to scrape the residual material from the belt surface, some of the cleaning elements are resiliently urged against the conveyor belt so that the cleaning element can deflect over splices and the like in the conveyor belt. In order to increase the reliability of such prior art cleaners, it has been suggested that the drive motor be directly coupled to the cleaning element. It has been tedious and time consuming to align the drive motor axis and the cleaning element axis so that vibrations were minimized at the operating speed of the unit to prolong the life the components and maintain even contact pressure on the conveyor belt.

SUMMARY OF THE INVENTION

These and other problems and disadvantages associated with the prior art are overcome by the invention disclosed therein by providing a conveyor belt cleaning system which is provided with an alignment system that allows the drive motor and cleaning element to be easily aligned for minimizing vibrations. This insures good belt cleaning while minimizing wear on the cleaning element and the mounting therefor. The cleaning element is resiliently biased into position so that it can be momentarily deflected away from its nominal position to permit the passage of belt irregularities thereby. The mountings for the cleaning element each include a movable plate captivated between a pair pair of self-lubricating slide members to permit the movable plate to slide therebetween with minimum wear and can be adjusted to compensate for wear.

The cleaning system embodying the invention includes a cleaning unit with a resiliently positioned ribbed cleaning roll and a backup unit opposite the cleaning unit across the conveyor belt to nominally locate the conveyor belt at a known position while passing the cleaning roll. The ribs on the cleaning roll engage material clinging to the conveyor belt to dislodge the material from the belt surface. The cleaning roll is rotatably mounted between a pair of mounting assemblies. Each mounting assembly has a base plate which is fixedly mounted adjacent the conveyor belt. Opposite ends of the cleaning roll are journalled in bearings mounted on movable plates overlying the base plate. A pair of guide assemblies movably mount each movable plate on the base plate. Each guide assembly has an inside slide member positioned between one side of the movable plate and the base plate and an outside slide member engaging the movable plate in opposition to the inside slide member. A spring assembly nominally maintains the ribbed cleaning roll in engagement with the surface of the conveyor belt. The spring assembly permits the roll to be deflected downwardly over belt irregularities. An alignment mechanism adjustably mounts the drive motor on one of the movable plates so that the drive motor can be axially aligned with the cleaning roll.

These and other features and advantages of the invention disclosed herein will become more apparent upon consideration of the following description and accompanying drawing wherein like characters of reference designate corresponding parts throughout the several views and in which:

BRIEF DESCRIPTION OF THE DRAWINGS

FIG. 1 is a view illustrating the invention installed on a conveyor system;

FIG. 2 is a cross-sectional view taken generally along line 2—2 in FIG. 1;

FIG. 3 is an enlarged cross-sectional view taken generally along line 3—3 in FIG. 2;

FIG. 4 is an enlarged elevational view of the non-drive support assembly;

Figure 5:
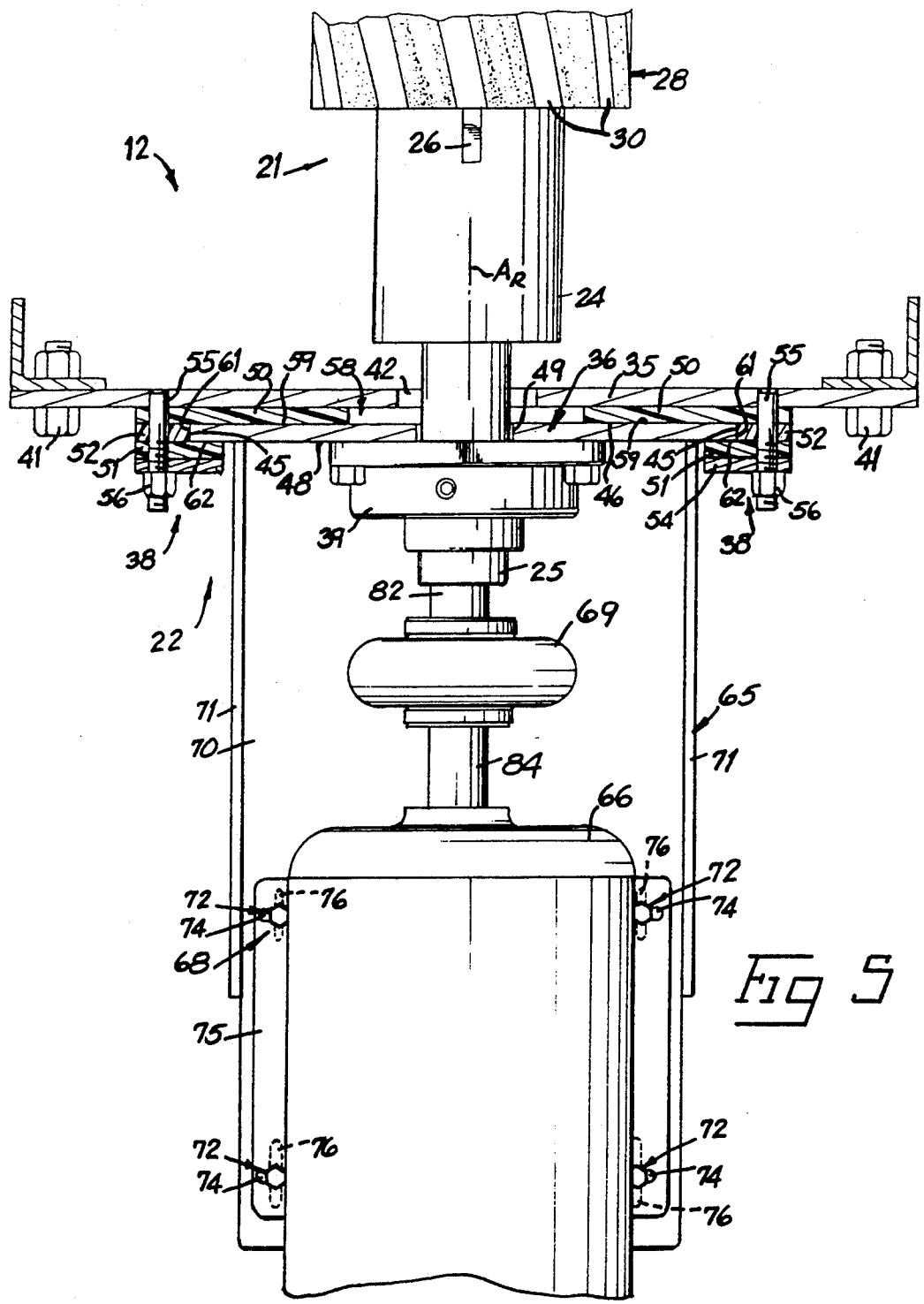
FIG. 5 is a cross-sectional view taken generally along line 5—5 in FIG. 2.
Figure 6:
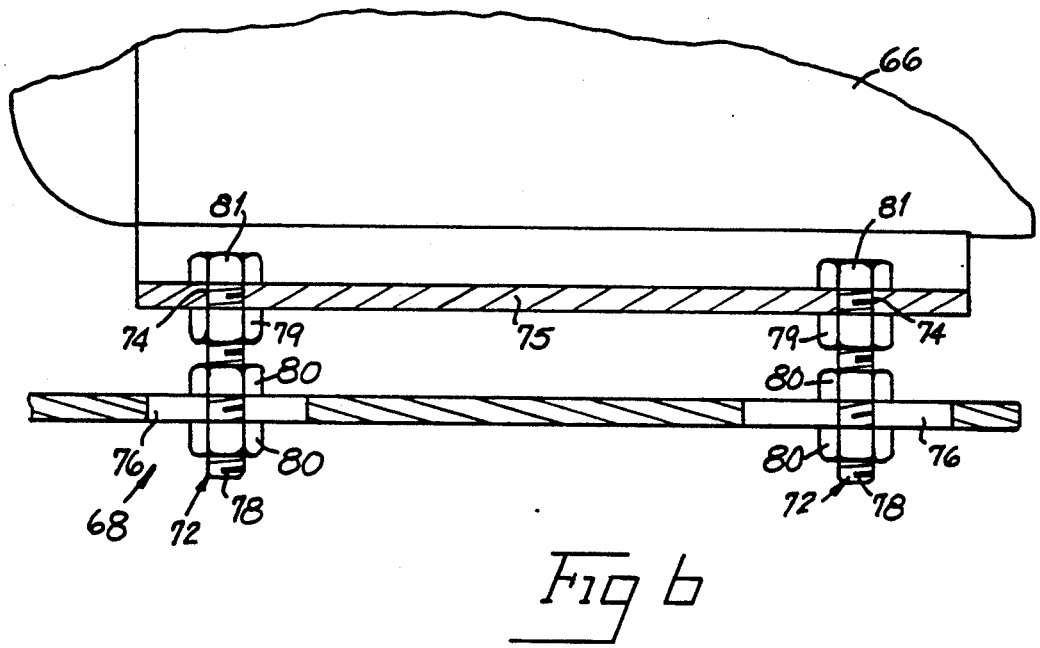
FIG. 6 is an enlarged view shown partly in cross-section of the motor alignment mechanism.

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

FIG. 1 illustrates a cleaning system 10 embodying the invention installed in a typical operating configuration on a conventional material transporting conveyor MTC. Only the upper portion of the conveyor MTC is seen in FIG. 1, the construction of the rest of the conveyor being well known. The conveyor MTC has a flexible conveyor belt CB trained around a driven head pulley HP at the upper end of the conveyor and an appropriate bottom pulley (not shown) at the lower end of the conveyor. The belt has an upwardly inclined carry flight CF and a downwardly inclined return flight RF between the head and bottom pulleys. The outside surface of the belt CB serves as the material carrying surface MCS, faces upwardly on the carry flight CF and downwardly on the return flight RF. The opposite inside surface IS of the belt CB contacts the head and bottom pulleys to support the belt. Additional carry idlers are provided under the carry flight CF to engage the inside surface IS and help support the conveyor belt and the material being transported. The return flight RF of the conveyor belt is also usually supported on return idlers RI under the flight that engage the material carrying surface MCS of the belt. The head pulley HP is typically mounted on a head pulley subframe SP of the conveyor framework CS so that its rotational axis AP is generally horizontal. A discharge hopper DH is located at the head pulley HP to catch the transported material as it is gravitationally discharged over the head pulley HP as indicated by arrow D in FIG. 1.

The cleaning system 10 serves to clean any residual particulate material still clinging to the material transporting surface MCS of the belt on its return flight RF. While the system 10 may be located at any position along the return flight RF of belt CB, it is typically located adjacent the upper end of the conveyor so that the residual material removed by the cleaning system can be discharged into the hopper DH. The cleaning system 10 includes generally a backup unit 11 which supports the return flight RF of the conveyor belt CB from the inside surface thereof and a cleaning unit 12 located across the belt from the backup unit 11, but spaced immediately upstream or downstream thereof so that the cleaning unit 12 dislodges any residual material still clinging to the material carrying surface MCS of the belt CB. The backup unit 11 keeps the belt taut to positively locate it while the cleaning unit 12 is located so that it nominally just contacts the surface MCS of belt CB as illustrated in FIG. 2.

The backup unit 11, best seen in FIG. 2, includes an idler roll 15 rotatably journalled between a pair of mounts 16 mounted on the conveyor framework CS, here shown as the head pulley subframe SF. The idler roll 15 is located over the return flight RF of belt CB to engage the inside surface IS thereof. Roll 15 has a constant diameter along the length thereof and a rotational axis $A_B$. The mounts 16 each include a base 18 fixedly attached to the inside of the side beam on subframe SF. A bearing 19 is slidably mounted on the base 18 for generally vertical adjustment along the base 18 and rotatably mounts the support shaft on the end of the idler roll 15 therein. An appropriate positioning mechanism 20 adjustably positions the bearing 19 along base 18. The mounts 16 are located so that the roll axis $A_B$ is normal to the longitudinal axis of the conveyor belt CB and the positioning mechanisms 20 are adjusted to force the roll 15 down against the inside surface IS of the return flight RF until the belt CB is taut between the head pulley HP and the uppermost return idler RI. This positively locates the return flight RF of belt CB at a nominal position in the vicinity of roll 15 and also eliminates vibrations of the belt in the vicinity of the roll 15. It will be appreciated, however, that variations in belt thickness in the conveyor belt CB such as those encountered at splices and repairs will cause the material transporting surface MCS to shift up and down as these irregularities pass around the roll 15.

The cleaning unit 12 is located under the return flight RF of belt CB across from the backup unit 11 and serves to dislodge any residual material still clinging to the material transporting surface MCS after it passes around the head pulley HP. The cleaning unit 12 includes a cleaning roll assembly 21 rotatably journalled in a pair of support assemblies 22. For the particular installation illustrated in the drawings, the support assemblies 22 are mounted on the head pulley subframe SF so that the roll assembly 21 is rotatably mounted about roll axis AR parallel to the idler roll axis AB. The cleaning roll assembly 21 is nominally located to just contact the material carrying surface MCS of the conveyor belt CB to dislodge the clinging material from that surface but shifted a short distance upstream or downstream of the idler roll 15. Typically, the cleaning roll assembly is rotated so that it moves countercurrent to the belt surface movement. It is to likewise be understood that the roll assembly may be rotated in the same direction as the belt movement in certain applications without departing from the scope of the invention. The support assemblies resiliently mount the cleaning roll assembly 21 for movement toward and away from the conveyor belt so that the cleaning roll assembly can be deflected downwardly to clear joints, splices and other irregularities in the conveyor belt CB as it passes over the cleaning roll assembly 21.

The cleaning roll assembly 21 best seen in FIGS. 2 and 3 includes a cylindrical tubular mounting arbor 24 equipped with mounting shafts 25 on opposite ends thereof coaxially extending with respect to arbor 24. The arbor 24 is equipped with longitudinally extending drive keys 26 projecting outwardly from the outer surface of the arbor. Resilient annular roll segments 28 with a prescribed outside diameter are fitted onto the outer surface of arbor 24 to complete the roll assembly 21. The roll segments 28 are provided with internally opening keyways 29 adapted to fit over and drivingly engage the drive keys so that the roll segments 28 are rotated with arbor 24.

The outer peripheral surface of the roll segments 28 are provided with spaced apart helically extending resilient ribs 30 that contact the belt surface to clean it. The recesses 31 between ribs 30 are constructed and arranged to permit the removed particulate material to fall off of the cleaning roll assembly so that it is self-cleaning, especially at the rotational speeds used with the cleaner. The helix angle of the ribs 30 is selected so that the ribs 30 at the opposite ends of each segment have the same orientation with respect to the keyways 29 so that the ends of the ribs 30 on each segment 18 automatically align with the ends of the ribs 30 on an adjacent segment 28 as seen in FIG. 2. This permits the segments 28 to be assembled on arbor 24 so that; (1) the ribs 30 from the different segments form composite continuous ribs extending along the length of roll assembly 21 or, (2) the ribs 30 form a herringbone pattern. The number of roll segments 28 may be varied as desired so that the overall working length of the roll assembly 21 corresponds to the width of the conveyor belt CB to be cleaned. A standard segment length of about six inches has been found convenient since conveyor belts are typically available in widths of six-inch increments. Because the segments 28 are relatively short, the original mounting or replacement thereof on arbor 24 is facilitated since the force required to mount or remove the segment is much less than that required for an element equal to the length of the arbor 24. Further, different length segments do not have to be inventoried to accommodate cleaning roll assemblies for different width conveyor belts at a customer's facility. The angle of opposite sides of each of the ribs 30 is the same so that the cleaning effectiveness of the segments 28 is the sane regardless of direction of rotation. This facilitates assembly of the segments 28 on arbor 24 since the workman does not have to pay particular attention to the orientation of the segments 28 with respect to roll rotation. Further, the material from which the segments 28 are made and the hardness thereof significantly affects the performance and wearability thereof. If has been found that a urethane/nylon material mixture which has a durometer value of 40-65 Shore "D" produces the best results. This construction removes the residual material with minimum rib deflection and thus minimize exposed wear surface. At the same time, this material does not damage the conveyor belt when it strikes the segments 28.

The support assemblies 22 are mounted on the outside of the conveyor frame CF on opposite sides of the return flight of conveyor belt CB. Assemblies 22 are illustrated mounted or the head pulley subframe SF in FIG. 2. Each of the support assemblies 22 as seen in FIGS. 2, 4 and 5 includes a base plate 35, a movable plate 36 overlying the base plate 35, a pair of guide assemblies 38 supporting the movable plate on the base plate, a bearing 39 mounted on the movable plate to support one end of the roll assembly 21, and a spring assembly 40 to resiliently position the movable plate 36.

Each base plate 35 is rectilinear and is fixedly mounted on one of the side beams of the subframe SF. Additional supports may be added to the subframe SF to help support the plate 35. The plate 35 has a size larger than the movable plate 36 and is oriented normal to the axis of the roll assembly 21 as best seen in FIGS. 2 and 5. The plates 35 may be attached to the subframe SF by any convenient means. That base plate 35 associated with the non-drive end of the roll assembly 21 is typically fixedly yet removably attached to the subframe SF as with the bolts 41 seen in FIGS. 4 and 5 as will become more apparent. Each plate 35 defines a clearance opening 42 therethrough through which the mounting shaft 25 on roll assembly 21 extends. The opening 42 as best seen in FIGS. 4 and 5 is sized to permit the mounting shaft 25 to move through its full range of adjustment and deflection without striking the base plate 35. It will be appreciated that the inside surface of the base plate 35 is exposed to some of the particulate material removed from the conveyor belt. As a result, some of this particulate material will pass through the clearance opening 42 through plate 35 and onto its outside surface.

Each movable plate 36 is also rectilinear but with a size smaller than that of base plate 35. Plate 36 has opposed parallel side edges 45 and parallel inside and outside surfaces 46 and 48. The plate 36 has a central hole 49 sized to just receive the mounting shaft 25 on roll assembly 21 in clearance therethrough.

The bearing 39 is fixedly mounted on the outside surface 48 of movable plate 36 and centered over the hole 49. Bearing 39 is a flange block type bearing and the shaft opening therethrough slidably receives the mounting shaft 25 on roll assembly 21 to rotatably support same. It will be appreciated that the inner race in bearing 39 can be removably connected to shaft 25 with the set screw in the bearing rather than being press fitted thereon. This allows the non-drive end of the roll assembly 21 to be quickly and easily disconnected as will become more apparent.

The guide assemblies 38 seen in FIGS. 4 and 5 serve both to movably support the movable plate 36 on the base plate 35 and also to space the movable plate 36 away from the base plate 35. The guide assemblies 38 are mounted on the base plate 35 and positioned along opposite sides of the movable plate 36. Each guide assembly 38 includes an inside slide member 50 positioned between the base plate 35 and movable plate 36, an outside slide member 51 positioned on the outside of the movable plate 36, an edge guide member 52 positioned between the inside and outside slide members 50 and 51, and a clamping member 54 to clamp the members 50-52 to base plate 35. A plurality of studs 55 fixedly mounted on the base plate 35 just outboard of the side edges 45 of movable plate 36 mount the members 50-52 and 54 thereon and are equipped with nuts 56 to clamp these members down as will become more apparent.

The slide member 50 is a rectilinear member and has a height about that of the movable plate 36. A plurality of holes are provided through one edge of member 50 receivable over the studs 55 to hold the slide member 50 in position laterally of the plate 35. The slide member 50 has a width such that it extends inwardly of studs 55 between the plates 35 and 36 to a position just outboard of the opening 42 in base plate 35 and a prescribed thickness illustrated at about ⅜ inch to space the movable plate 36 away from the base plate 35. Thus, it will be seen in FIG. 5 that a vertically oriented clearance channel 58 is defined between the innermost edges of the slide members 50 and the plates 35 and 36. The channel 58 is aligned with the opening 42 through the base plate 35 so that any particulate material passing out through opening 42 will freely fall down the channel 58 thereby minimizing wear. The slide member 50 is made out of a bearing material with a low coefficient of friction and good abrasion resistance especially at the outside surface 59 of the member 50 against which the inside surface 46 of movable plate 36 slides. Preferably, the slide member 50 is impregnated with a dry lubricant to further enhance lubricity without tending to collect particulate material. One material that has worked particularly well is a plastic with a dry lubricant dispersion available under the tradename "Nylatron GS". This material is a type 6/6 nylon with finely divided particles of molybdenum disulfide solid lubricant dispersed therein. The area of contact between the slide member 50 and the movable plate 36 should be maximized in order that the unit loading at the interface therebetween be minimized. Preferably at least 50% of the area of the plate surface 46 should be in contact with the member 50 and is illustrated with about a 63% contact area.

The edge guide member 52 has about the same height as members 50 and also defines holes therethrough receivable over the studs 55 so that the edge guide member 52 is juxtaposed over the edge portion of the slide member 50. The guide member 52 has an inboard guide edge 61 which slidably engages one of the side edges 45 of the movable plate 36. The studs 55 and guide members 52 are located and sized so that the guide edges 61 of opposed guide members 52 are parallel and space apart a distance substantially equal to the width of the movable plate 36. The thickness of the guide member 52 is nominally equal to the thickness of plate 36. The guide edges 61 are substantially vertically oriented to confine the plate 36 to vertical movement. At least the guide edge 61 of the guide member 52 is a low friction surface. The guide member 52 is preferably made out of the same material as the slide member 50. As will become more apparent the guide member 52 is preferably also compressible to a limited extent.

The outside slide member 51 also defines holes therethrough along its outer edge receivable over the studs 55 so that it overlies the guide member 52. The slide member 51 is wider than the guide member 52 so that it projects inwardly over the edges of the outside surface 48 of the movable plate 36. The inside surface 62 of the slide member 51 bears against the outside surface 48 of plate 36. Because the outside surface of the movable plate 36 is usually exposed to a less adverse environment than the inside surface thereof, the unit loading on the contact area of slide member 51 with plate 36 can be increased. This allows the contact area to be reduced and is illustrated at about 13% of the area of the outside surface 48 of plate 36. The member 51 has a height about equal to that of the slide member 50. At least the inside surface 62 of the member 52 is a low friction surface. The slide member 51 is preferably made out of the same material as the slide member 50.

The clamping member 54 is an elongate metal strip with holes in it to fit over the studs 55. The member 54 is sized to substantially cover the outside slide member 52 when it is placed over the studs 55. After the member 54 is placed over the studs 55 and against the slide member 52, the nuts 56 are tightened to clamp the members 50-52 between the base plate 35 and the clamping member 54. This forces the inside and outside slide members 50 and 51 into bearing contact with the inside and outside surfaces 46 and 48 of the movable plate 36. The plate 36 is thus slidably supported so that it remains parallel to the base plate 35 and also generally normal to the roll axis $A_R$.

As the inside and outside slide members 50 and 51 wear, the nuts 56 can be further tightened to compress the members 50-52 sufficiently until the members 50 and 51 are again in bearing contact with the inside and outside surfaces 46 and 48 of the movable plate 36 so that the movable plate 36 can be maintained parallel to the base plate 35.

The nuts 56 illustrated are provided with internal locking features that keep the nuts 56 from loosening during operation of the cleaning unit. It will be appreciated, however, that separate lock nuts can be used to provide this function. In any event, it is desirable that the nuts 56 be capable of adjustment to maintain the position of the movable plate 36 as it is slidably supported by the guide assemblies 38. It will also be appreciated that the nuts 56 may be removed and new slide members 50 and 51 as well as the guide member 52 replaced in the event the members 50-52 wear out.

The movable plate 36 on one of the support assemblies mounts the drive unit 14 thereon which drivingly rotates the roll assembly 21. The drive unit 14 included a mounting 65, a drive motor 66, a shaft alignment mechanism 68 and a shaft coupling 69. The mounting 65 includes a base plate 70 which is oriented normal to the movable plate 36 and generally parallel to the roll axis $A_R$. Side braces 71 attached to the movable plate 36 keep the base plate 70 in a fixed position with respect to the movable plate 36. The shaft alignment mechanism 68 mounts the drive motor 66 on the base plate 70.

The alignment mechanism 68 comprises four fastener assemblies 72, the elongated bolt holes 74 through the mounting base 75 on the motor 66, and the elongated bolt holes 76 through the base member 70. Each of the fastener assemblies 72 is associated with one of the bolt holes 74 in the motor mounting base 75 and a corresponding one of the holes 76 in the base member 70. Each of the fastener assemblies 72 included a threaded bolt 78 and a motor nut 79 along with a pair of base member nuts 80. The motor nut 79 serves to clamp the motor mounting base 75 between it and the bolt head 81 while the two base member nuts 80 serve to clamp the base member 70 therebetween. It will be appreciated that the bolts 78 could be reversed in the mounting without departing from the inventive concept. The mounting holes 74 in the motor mounting member 75 are elongated in a direction normal to the holes 76 in the base member 70 which allows the motor 66 to be shifted in any horizontal direction for a limited distance. This allows the motor drive shaft 84 to be aligned in a horizontal plane with the stub shaft 82 on the end of the arbor shaft 25. After the drive motor shaft 84 is aligned in a horizontal plane, the motor nut 79 is tightened up against the motor mounting base 75 to fix the position of the bolt 78 on the base 75. The base member nuts 80 are then manipulated to vertically adjust the position of the motor 66. This allows the motor drive shaft 84 to be aligned with the roll axis $A_R$ so that the stub shaft 82 on the arbor 24 is coaxial with the motor drive shaft 84.

After this alignment is achieved, the shafts 84 and 82 are aligned to generate the minimum vibration due to misalignment. Once alignment is achieved, the nuts 80 are tightened onto the base member 70 to lock the motor 66 in place. The coupling 69 is tightened onto the base member 70 to lock the motor 66 in place. The coupling 69 is tightened onto both shafts 84 and 82 to drivingly connect the motor 66 to the roll assembly 21.

The position of the movable plate 36 in each support assembly 22 is controlled through spring assembly 40 best seen in FIG. 4. The spring assembly 40 is located adjacent the top of the unit and resiliently supports the movable plate 36 in a neutral position so that the ribs 30 on the cleaning roll assembly 21 just touch or pass closely adjacent the material transporting surface MCS of the conveyor belt as it passes the idler roll 15. At the same time, the spring assembly 40 permits the cleaning roll assembly 21 along with the movable plate 36 to be deflected downwardly when irregularities in belt thickness such as splices and the like cause the belt to strike the roll assembly 21. After the irregularity in the conveyor belt has passed the cleaning roll assembly 21, the spring assembly 40 again raises the roll assembly back to the neutral position which is seen in FIGS. 2 and 3.

The spring assembly 40 includes a support tab 86 which is fixedly mounted on the base plate 35 at its top edge so that the support tab 86 is centered over the movable plate 36. The support tab 86 projects outwardly from the base plate 35 over the top of the movable plate 36 generally normal to plate 35. The support tab 86 has a hole in the outer projecting end thereof through which is mounted a bolt 88. The bolt 88 is adjustably mounted in the tab 86 by top and bottom adjustment nuts 89. The lower end of the bolt 88 mounts cross plate 90 thereon which is fixedly attached to the bolt 88 and projects outwardly on opposite sides thereof normal to the bolt axis. The cross plate 90 is sized so that it clears the movable plate 36. The distance between the cross plate 90 and the support tab 86 can be changed by manipulating the adjustment nuts 89 connecting bolt 88 to the tab 86.

An inverted L-shaped spring bracket 91 is attached to the upper edge of the movable plate 36 so that vertical leg of the bracket 91 extends upwardly from the movable plate 36 while the horizontal leg 92 thereof projects outwardly from the base plate 35. The leg 92 of the bracket 91 defines a central hole therethrough which is movably received around the bolt 88 mounted on the support tab 86. This allows the bracket 91 to move up and down along the bolt 88 as will become more apparent. The horizontal leg 92 of the bracket 91 extends outwardly on opposite sides of the bolt 88 and overlies the cross plate 90.

Opposite ends of the horizontal leg 92 mount spring guides 94 therein which slidably extend through appropriate holes in opposite ends of the cross plate 90. Retaining washers 95 are fixed to opposite ends of the spring guides 94 so that the movement of the horizontal leg 92 on the bracket 91 away from the cross plate 90 is limited by the washers 95. Typically, the guide pins 94 are welded to the horizontal leg 92 of the bracket 91 so that the guide pins 94 serve to prevent the cross plate 90 from rotating up against the movable plate 36, especially while the cross plate 90 is being raised and lowered as will become more apparent.

A compression coil spring 96 is received around each of the guide pins 94 between the cross plate 90 and the horizontal leg 92 of the bracket 91. To support the additional weight of the motor 66, and additional spring 96 is also received around the bolt 88 between the cross plate 90 and the horizontal leg 92 of the bracket 91 on the drive side mounting 22. Since the cross plate 90 is selectively fixed with respect to the base plate 35, the springs 96 resiliently carry the weight of the movable plate 36 and the components supported thereby. It will be appreciated that the weight supported by the springs 96 on the drive side of the unit will be considerably more than the weight supported thereby on the non-drive side. It will also be appreciated that different numbers of springs 96 may be used by extending the bracket 91 and cross plate 90 so that the additional springs can be mounted therebetween when greater weights are to be encountered. The spring constant of the springs 96 and the number of springs used between the bracket 91 and the cross plate 90 is such that the weight supported through the springs 96 will partly compress the springs as illustrated in FIG. 4. Thus, the weight supported by the springs 96 in each support assembly 22 causes the movable plate 36 to reach a neutral partly compressed position where the springs 96 will cause the plate 36 to move up if the load is lessened and to move downwardly as the load is increased.

The nuts 89 are adjusted to move the bolt 88 until the ends of the ribs 30 on the segments 28 just touch or are closely adjacent the material transporting surface MCS of the belt CP as best seen in FIG. 3. When an irregularity such as a splice or the like passes the idler roll IS, the belt will strike the end of the ribs 30 and deflect the roll assembly 21 downwardly against the action of the springs 96 until the irregularity has passed the roll assembly 21.

The springs 96 then move the roll assembly 21 back up to its neutral position to continue the cleaning of the belt. In practice, the bolt 88 is adjusted until the ends of the ribs 30 just contact the belt CB. This position is easily detected simply by feeling the movable plate because slight vibrations are generated in the movable plate 36 as the ribs 30 strike the belt surface.

The segments 28 are easily changed by removing the bolts holding the fixed plate 35 in the non-drive side support assembly 22 and removing the complete mounting assembly off the end of the mounting shaft 25 on the roll assembly 21. The segments 28 are then slipped off the end of roll assembly 21 and replaced with new segments. After the new segments are in place, the fixed plate 35 is reattached with the bolts. Before new segments are installed, it will be appreciated that the bolts 88 will be lowered to insure clearance of the new segments 28. After the new segments are installed, the bolts 88 are then adjusted to raise the roll assembly 21 back up to its operative position on the material transporting surface of the belt.

The spacing between the idler roll 15 and cleaning roll assembly 21 is such that the conveyor belt CB is taut and nominally not vibrating as it passes over the cleaning roll assembly 21. This positively locates the belt CB relatively to the cleaning roll assembly 21 so that assembly 21 operates nominally closely adjacent the surface MCS on belt CB yet permits some flexure in belt CB when an irregularity is encountered to help reduce the shock loading on the roll assembly 21. Usually the roll assembly 21 is shifted 3-4 inches along the belt CB from the idler roll 15.

What is claimed as the invention is:

1. Apparatus for cleaning clinging residual material from a conveyor belt comprising:

a ribbed cleaning roll having a central axis;
   a pair of mounting assemblies on opposite sides of the conveyor belt rotatably supporting said cleaning roll adjacent that surface of the conveyor belt to be cleaned;
   a drive motor for rotating said cleaning roll; and
   motor mounting means for mounting said drive motor on one of said mounting assemblies, said motor mounting means including alignment means for selectively locating said drive motor along three perpendicular axes of movement, wherein said alignment means includes:
   first means selectively fixable yet movable with respect to said drive motor;
   second means selectively fixable yet movable with respect to one of said mounting assemblies; and
   third means selectively fixable yet movably interconnecting said first and second means so that said drive motor can be coaxially aligned with the central axis of said cleaning roll.

2. The apparatus of claim 1 wherein said motor mounting means comprises:

a base member carried by said mounting assembly and oriented generally parallel to the central axis of said cleaning roll, said base member defining a plurality of elongate holes therethrough and oriented lengthwise substantially parallel to the central axis of said cleaning roll;
   a motor mount on said motor adapted to be located generally parallel to said base member, said motor mount defining a plurality of elongate holes therethrough overlying said holes in said base member and oriented lengthwise substantially normal to said holes in said base member; and,
   a plurality of fastener assemblies interconnecting said holes in said base member with said holes in said motor mount to selectively fix the position of said drive motor with respect to said base member and to selectively continuously vary the spacing between said base member and said motor mount.

3. The apparatus of claim 2 wherein each of said fastener assemblies comprises:

a threaded bolt extending through one of said holes in said base member and a corresponding one of said holes in said motor mount and including an enlarged bolt head thereon;
   a first nut threadedly received on said bolt and cooperating with said bolt head to clamp said motor mount between said bolt head and said first nut; and,
   a pair of second nuts threadedly received on said bolt and cooperating with each other to clamp said base member therebetween.

4. The apparatus of claim 3 wherein each of said mounting assemblies includes:

a base member fixedly mounted adjacent the side of the conveyor belt and defining an opening therethrough through which one end portion of said cleaning roll extends;
   a movable member overlying said base member and having opposed side edges;
   bearing means on said movable member rotatably supporting that end portion of said cleaning roll extending through said base member; and,
   guide means mounted on said base member and slidably supporting said movable member for movement thereof relative to said base member, said guide means including inside slide means positioned between said base member and said movable member and said outside slide means slidably engaging said movable member in opposition to said inside slide means to maintain said movable member in contact with said inside means, said outside and inside slide means each defining an antifriction surface thereon engaging said movable member so that said movable member is slidably supported between said inside and outside slide means.

5. The apparatus of claim 4 wherein said guide means further includes adjustment means for selectively varying the distance between said first and second slide means so as to maintain sliding engagement between said movable member and said first and second slide means.

6. The apparatus of claim 4 wherein said inside slide means includes a pair of spaced apart inside slide members positioned between said base and movable members along the opposed side edges of said movable member and defining a downwardly opening channel between said inside slide members, said base member and said movable member below said opening through said base member so that any residual material passing outwardly through said opening in said base member can fall down said channel.

7. The apparatus of claim 4 wherein said guide means further includes edge guide means slidably engaging the opposed side edges of said movable member and mounted on said base member so as to cause said movable member to move along a generally vertical path, said edge guide means defining antifriction surfaces thereon slidably engaging said opposed side edges of said movable member.

8. The apparatus of claim 7 wherein said inside slide means includes a pair of spaced apart inside slide members between said base member and said movable member along the opposed said side edges of said movable member; wherein said outside slide means includes a pair of outside slide members engaging said movable member along the opposed side edges thereof in opposition to said slide members; and wherein said edge guide means includes a pair of spaced apart edge guide members positioned between said inside and outside slide members along the opposed side edges of said movable member and slidably engaging the opposed side edges of said movable member, each of said inside slide members, said outside slide members, and said edge guide members being made out of plastic with dry lubricant dispersed therein.

9. The apparatus of claim 8 further including a plurality of threaded members mounted on said base member along spaced apart paths on opposite sides of said movable member and a plurality of nuts threadedly engaging said threaded members, each of said slide members and said guide members defining a plurality of holes therethrough adapted to be received over said threaded members and be held on said threaded members by said nuts so that said movable member is engaged by said slide members as said nuts are tightened.

10. The apparatus of claim 4 wherein each of said support assemblies further includes a positioning assembly operatively connecting said base member with said movable member to resiliently position said movable member in said guide means with respect to said base member, each of said positioning assemblies including a first member connected to said base member, a second member connected to said movable member and spring means connecting said first and second members so that said movable member is resiliently positioned within said guide means through said spring means.

11. The apparatus of claim 10 wherein each of said positioning assemblies further includes adjustment means adjustably connecting said first member to said base member so that said first member can be moved with respect to said base member without effecting the resiliency range of said spring means and to selectively change the position of said rib bed cleaning roll with respect to the conveyor belt.

* * * * *